United States Patent

Braun et al.

[11] Patent Number: 6,054,523
[45] Date of Patent: Apr. 25, 2000

[54] AQUEOUS DISPERSIONS OF ORGANOPOLYSILOXANES

[75] Inventors: Rudolf Braun, Kastl; Karl Braunsperger, Burghausen; Herbert Söllradl, Emmerting; Stefan Oberneder; Robert Braunsperger, both of Burghausen, all of Germany

[73] Assignee: Wacker-Chemie GmbH, München, Germany

[21] Appl. No.: 08/340,017

[22] Filed: Nov. 15, 1994

Related U.S. Application Data

[63] Continuation of application No. 08/056,088, May 3, 1993.

[30] Foreign Application Priority Data

May 27, 1992 [DE] Germany .............................. 42 17 561

[51] Int. Cl.[7] ................................. C08J 3/00; C08K 5/24; C08L 29/04; C08L 83/00
[52] U.S. Cl. .......................... 524/503; 524/262; 524/506
[58] Field of Search ..................... 524/262, 503, 524/506

[56] References Cited

U.S. PATENT DOCUMENTS

| | | | |
|---|---|---|---|
| 4,624,900 | 11/1986 | Fau | 524/588 |
| 4,816,506 | 3/1989 | Gamon | 524/588 |
| 4,833,187 | 5/1989 | Sittenthaler et al. | 524/262 |
| 4,954,539 | 9/1990 | Cavezzan et al. | 524/27 |
| 5,039,724 | 8/1991 | Demlehner et al. | 524/267 |
| 5,045,231 | 9/1991 | Braun et al. | 524/859 |

FOREIGN PATENT DOCUMENTS

| | | |
|---|---|---|
| 0169098 | 1/1986 | European Pat. Off. . |
| 0350413 | 1/1990 | European Pat. Off. . |
| 0366133 | 5/1990 | European Pat. Off. . |
| 0419986 | 4/1991 | European Pat. Off. . |
| 0420522 | 4/1991 | European Pat. Off. . |

*Primary Examiner*—Patrick D. Niland
*Attorney, Agent, or Firm*—Brooks & Kushman P.C.

[57] ABSTRACT

Aqueous dispersions of organopolysiloxanes comprising (A) an organopolysiloxane containing groups which are capable of condensation, (B) a condensation catalyst, (C) an organopolysiloxane resin which is at least partly soluble in organopolysiloxane (A) when present in amounts of up to 50% by weight based on the weight of (A), (D) a compound containing basic nitrogen and (E) polyvinyl alcohol. The aqueous dispersions are prepared by dissolving the organopolysiloxane resin (C) in the organopolysiloxane (A) and then emulsifying the solution with polyvinyl alcohol (E) and water. The stable aqueous dispersions of the present invention cure to form transparent films.

11 Claims, No Drawings

AQUEOUS DISPERSIONS OF ORGANOPOLYSILOXANES

This application is a continuation of application Ser. No. 08/056,088, filed May 3, 1993.

The invention relates to aqueous dispersions of organopolysiloxanes and more particularly to aqueous dispersions of organopolysiloxanes which, after removal of water, can be converted into elastomers, processes for preparing the same and their use.

BACKGROUND OF THE INVENTION

Environmental protection measures increasingly necessitate the avoidance of organic solvents in chemical formulations. Aqueous systems are accordingly being used more and more.

Aqueous dispersions of organopolysiloxanes are well known in the art. For example, aqueous silicone dispersions containing hydroxylated diorganopolysiloxanes, colloidal silicon dioxide and an organic amine or sodium hydroxide are described in U.S. Pat. No. 4,221,688 (R. D. Johnson, Dow Corning Corp.; issued Sep. 9, 1980).

Aqueous silicone dispersions which are obtained by adding an alkali metal silicate to an anionically stabilized aqueous emulsion of a polydiorganosiloxane containing hydroxyl end groups are described in U.S. Pat. No. 4,244,849 (J. C. Saam, Dow Corning Corp.; issued Jan. 13, 1981). Aqueous dispersions which contain siliconates in addition to the polydiorganosiloxanes containing hydroxyl groups in the terminal units and (organo)metallic compounds are described in U.S. Pat. No. 4,816,506 (N. Gamon, Wacker-Chemie GmbH; issued Mar. 28, 1989) as well as U.S. Pat. No. 5,045,231 (R. Braun, Wacker-Chemie GmbH; issued Sep. 3, 1991) and corresponding DE 39 32 025 A (published on Apr. 4, 1991).

Therefore, it is an object of the present invention to provide aqueous organopolysiloxane dispersions which are stable over long periods of time. Another object of the present invention is to provide aqueous organopolysiloxane dispersions which can be used without a long storage time. A further object of the present invention is to provide aqueous organopolysiloxane dispersions which can be used to prepare elastomers.

SUMMARY OF THE INVENTION

The foregoing objects and others which will become apparent from the following description are accomplished in accordance with this invention, generally speaking, by providing aqueous dispersions of organopolysiloxanes comprising (A) an organopolysiloxane containing groups which are capable of condensation, (B) a condensation catalyst, (C) an organopolysiloxane resin having a molecular weight of not more than 20,000, (D) a compound containing a basic nitrogen and (E) polyvinyl alcohol.

DESCRIPTION OF THE INVENTION

The organopolysiloxanes (A) which contain groups which are capable of condensation and are employed according to this invention are preferably those of the formula

(I), wherein R can be the same or different and represents a hydrogen atom or an alkyl radical having from 1 to 6 carbon atom(s), $R^1$ can be the same or different and represents hydrocarbon radicals having from 1 to 18 carbon atom(s), which optionally may be substituted by halogen atoms, amino groups, ether groups, ester groups, epoxy groups, mercapto groups, cyano groups or (poly)-glycol radicals, in which the (poly)glycol radicals are built up from oxyethylene and/or oxypropylene units, and n is an integer of at least 30.

Examples of hydrocarbon radicals represented by $R^1$ are alkyl radicals, such as the methyl, ethyl, n-propyl, isopropyl, 1-n-butyl, 2-n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and allyl radicals; cycloalkyl radicals, such as cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and the β-phenylethyl radicals.

Examples of substituted hydrocarbon radicals represented by $R^1$ are halogenated radicals, such as the 3-chloropropyl radical, the 3,3,3-trifluoro-propyl radical, chlorophenyl radicals and hexafluoropropyl radicals, such as the 1-trifluoromethyl-2,2,2-trifluoroethyl radical; the 2-(perfluorohexyl)ethyl radical, the 1,1,2,2-tetrafluoroethyloxypropyl radical, the 1-trifluoromethyl-2, 2,2-trifluoroethyloxypropyl radical, the perfluoroisopropyloxyethyl radical and the perfluoroisopropyloxypropyl radical; radicals substituted by amino groups, such as the N-(2-aminoethyl)-3-aminopropyl radical, the 3-aminopropyl radical and the 3-(cyclohexylamino) propyl radical; radicals containing the ether function, such as the 3-methoxypropyl radical and the 3-ethoxypropyl radical; radicals containing the cyano function, such as the 2-cyanoethyl radical; radicals containing the ester function, such as the methacryloxypropyl radical; radicals containing the epoxy function, such as the glycidoxypropyl radical, and radicals containing the sulfur function, such as the 3-mercaptopropyl radical.

Preferred radicals represented by $R^1$ are hydrocarbon radicals having from 1 to 10 carbon atom(s), more preferably at least 80%, in particular at least 90%, of the radicals represented by $R^1$ being methyl radicals.

Preferred radicals represented by R are the hydrogen atom and alkyl groups having from 1 to 4 carbon atom(s), in which the hydrogen atom and the methyl and ethyl radicals are particularly preferred.

The average value for the number n in formula (I) is preferably selected so that the organopolysiloxane of formula (I) has a viscosity of more than 30 mPa·s, and in particular more than 10,000 mpa·s, measured at a temperature of 25° C.

Although not shown in formula (I), up to 10 mol percent of the organopolysiloxane units can be replaced by other siloxane units, but usually only by those which are present as impurities which can be avoided with more or less difficulty, such as $R^1{}_3SiO_{1/2}$—, $R^1SiO_{3/2}$— and $SiO_{4/2}$— units, wherein $R^1$ is the same as above.

The polydiorganosiloxanes of formula (I) can be prepared by processes known in the art, for example by polymerization or condensation of low molecular weight cyclic or linear organopolysiloxanes blocked by hydroxyl and/or alkoxy end groups.

Reference may be made, for example, to W. Noll, "Chemistry and Technology of Silicones", 1968, Academic Press Inc., page 218 et seq.

The organopolysiloxane (A) which contains groups that are capable of condensation and is employed in this invention can be a single type or a mixture of at least two types of such organopolysiloxanes which contain groups which are capable of condensation.

The condensation catalysts (B) employed in this invention are preferably (organo)metallic compounds, such as, for example, the salts of carboxylic acids, the alcoholates and the halides of the metals Pb, Zn, Zr, Ti, Sb, Fe, Cd, Sn, Ba, Ca and Mn. Preferable the catalysts are (organo)tin compounds of carboxylic acids having from 1 to 18 carbon atom(s) and (organ)tin halides, such as organotin octoates, naphthenates, hexoates, laurates, acetates, bromides and chlorides.

Examples of such (organo)tin compounds are tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate and trioctyltin acetate. Especially preferred compounds are diorganotin dicarboxylates, and in particular dibutyltin dilaurate, dioctyltin dilaurate, dibutyltin diacetate and dioctyltin diacetate.

Condensation catalyst (B) is employed in amounts of preferably from 0.01 to 7 parts by weight, and more preferably from 0.05 to 2.0 parts by weight, in each case per 100 parts by weight of organopolysiloxane (A) containing groups which are capable of condensation.

The organopolysiloxane resin (C) employed in the invention is preferably one consisting of units of the general formula

  (II)

wherein $R^2$ is the same as $R^1$ and a is a number having an average value of from 0.5 to 1.95, and in particular from 0.8 to 1.8.

Although not expressed by formula (II), the organopolysiloxane resin can contain up to 10% by weight of Si-bonded hydroxyl groups and/or chlorine atoms and/or alkoxy groups as a result of its preparation.

Preferred radicals represented by $R^2$ in formula (II) are methyl, ethyl, vinyl and phenyl radicals, and in particular methyl radicals.

The organopolysiloxane resin (C) employed in this invention has a molecular weight of preferably not more than 10,000, and more preferably not more than 4000.

Examples of organopolysiloxane resins (C) employed in this invention are those of units of the formula $[CH_3SiO_{3/2}]$ and $[(CH_3)_2SiO]$ (TD-resin C), and those of units of the formula $[(CH_3)_3SiO_{1/2}]$ and $[SiO_{4/2}]$ (MQ-resin C).

The organopolysiloxane resin (C) employed in this invention is preferably a resin of the formula $[CH_3SiO_{3/2}]_{0.6-0.8}$ $[(CH_3)_2SiO]_{0.2-0.4}$ having an average molecular weight of between 2500 and 3500, and of the formula $[(CH_3)_3SiO_{1/2}]_{0.4-0.6}[SiO_{4/2}]_{0.4-0.6}$ having an average molecular weight of between 200 and 10,000 (MQ-resin C), and in particular $[CH_3SiO_{3/2}]_{0.6-0.8}$ $[(CH_3)_2SiO]_{0.2-0.4}$ having an average molecular weight of between 500 and 6000.

The organopolysiloxane resin (C) employed in this invention is at least partly soluble, but preferably completely soluble, in organopolysiloxane (A) when used in a range of up to 50% by weight, based on the weight of organopolysiloxane (A).

If the content of $[CH_3SiO_{3/2}]$ units in the (TD-resin C) is less than about 40 mol %, the (TD-resin C) has a more or less unlimited solubility in organopolysiloxane (A). As the content of $[CH_3SiO_{3/2}]$ units increases, the solubility decreases, (TD-resins C) having a content of $[(CH_3SiO_{3/2}]$ units of about 80 mol % in general still are soluble in a sufficient amount in organopolysiloxane (A).

If the content of $[(CH_3)_3SiO_{1/2}]$ units in the (MQ-resin C) is more than about 50 mol %, the (MQ-resin C) has a more or less unlimited solubility in organopolysiloxane (A).

The organopolysiloxane resin (C) employed in this invention can be prepared by processes which are known in the art, such as, for example, by condensation of low molecular weight organopolysiloxane resins in dispersions. It is possible for the low molecular weight organopolysiloxane resins to be prepared by solvolysis and condensation from a solution of the corresponding silanes having Si-bonded chlorine atoms in a water-immiscible solvent by means of an alcohol/water mixture. Reference may be made, for example, to W. Noll, "Chemistry and Technology of Silicones"; Academic Press, Orlando, 1968, pages 190 to 208.

The organopolysiloxane resin (C) employed in this invention can be a single type or a mixture of at least two types of such organopolysiloxane resins.

Organopolysiloxane resin (C) is employed in amounts of preferably from 0.1 to 100 parts by weight, and more preferably 0.5 to 35 parts by weight, per 100 parts by weight of organopolysiloxane (A) containing groups which are capable of condensation, in the preparation of the aqueous organopolysiloxane dispersions of this invention.

Compounds (D) containing basic nitrogen which are employed in this invention are preferably those selected from the group comprising (a) compounds of the formula $$NR^3{}_3 \quad (III),$$

wherein $R^3$ can be the same or different and represents a hydrogen atom or hydrocarbon radicals having from 1 to 18 carbon atom(s), which are optionally substituted by hydroxyl groups, halogen atoms, amino groups, ether groups, ester groups, epoxy groups, mercapto groups, cyano groups or (poly)glycol radicals, in which the (poly)glycol radicals are built up from oxyethylene and/or oxypropylene units, with the proviso that in formula (III) not more than two $R^3$ groups represents a hydrogen atom, (b) aliphatic cyclic amines, such as, for example, piperidine and morpholine, and (c) organosilicon compounds which have at least one organic radical containing basic nitrogen and contain units of the formula

  (IV)

wherein $R^4$ can be the same or different and represents a monovalent organic radical which is free from basic nitrogen, $R^5$ can be the same or different and represents a hydrogen atom, an alkyl radical, an alkali metal cation or an ammonium or phosphonium group, Y can be the same or different and represents a monovalent SiC-bonded radical containing basic nitrogen, b is 0, 1, 2 or 3, c is 0, 1, 2, 3 or 4 and d is 0, 1, 2 or 3, with the proviso that the sum of b, c and d is less than or equal to 4 and at least one radical Y is present per molecule.

The radicals represented by $R^4$ are preferably hydrocarbon radicals having from 1 to 18 carbon atom(s), in which the methyl, ethyl and propyl radicals are preferred, and more preferable $R^4$ represents the methyl radical.

Examples of the radical $R^4$ are the same examples as those hydrocarbon radicals described for $R^1$.

The radicals represented by $R^5$ is preferably a hydrogen atom, a methyl or ethyl radical or an alkali metal cation, in which the hydrogen atom, the methyl or ethyl radical or a sodium or potassium cation is the preferred $R^5$ radical.

Examples of the radicals represented by $R^5$ are the hydrocarbon radicals described for the radical R, the cations of the alkali metals, such as those of lithium, sodium, potassium, rubidium and cesium, and radicals of the formula $$+NR^6{}_4 \qquad (V)$$

or $$+PR^6{}_4 \qquad (VI),$$

wherein $R^6$ can be the same or different and represents a hydrocarbon radical having from 1 to 6 carbon atom(s).

The radicals Y are preferably those of the formula $$R^7{}_2NR^8- \qquad (VII),$$

wherein $R^7$ can be the same or different and represents hydrogen or alkyl, cycloalkyl or amino alkyl radicals and $R^8$ represents a divalent hydrocarbon radical.

The examples of alkyl and cycloalkyl radicals represented by $R^1$ are also appliciable to the alkyl and cycloalkyl radicals represented by $R^7$.

Preferably, at least one hydrogen atom is bonded to each nitrogen atom in the radicals of formula (VII).

The radicals $R^8$ are preferably divalent hydrocarbon radicals having from 1 to 10 carbon atoms, and more preferably from 1 to 4 carbon atoms, and in particular the n-propylene radical.

Examples of radicals represented by $R^8$ are the methylene, ethylene, propylene, butylene, cyclohexylene, octadecylene, phenylene and butenylene radicals.

Examples of the radicals Y are $H_2N(CH_2)_3-$, $H_2N(CH_2)_2NH(CH_2)_2-$, $H_2N(CH_2)_2NH(CH_2)_3-$, $H_2N(CH_2)_2-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$ and $(C_2H_5)_2N(CH_2)_2-$.

Examples of the radicals Y are preferably $H_2N(CH_2)_3-$, $H_2N(CH_2)_2NH(CH_2)_3-$, $H_3CNH(CH_2)_3-$, $C_2H_5NH(CH_2)_3-$ and cyclo-$C_6H_{11}NH-(CH_2)_3-$, in which $H_2N(CH_2)_2NH(CH_2)_3-$ and cyclo-$C_6H_{11}NH(CH_2)_3-$ are particularly preferred.

If the organosilicon compounds containing units of the formula (IV) are silanes, b is preferably 0, 1 or 2, and more preferably 0 or 1, c is preferably 1, or 2, and more preferably 1, and d is preferably 1, 2 or 3, and more preferably 2 or 3, with the proviso that the sum of b, c and d is 4.

Examples of the silanes of formula (IV) of this invention are $H_2N(CH_2)_3-Si(OCH_3)_3$, $H_2N(CH_2)_3-Si(OC_2H_5)_3$, $H_2N(CH_2)_3-Si(OCH_3)_2CH_3$, $H_2N(CH_2)_3-Si(OC_2H_5)_2CH_3$, $H_2N(CH_2)_3-Si(OH)_{3-x}(OM)_x$, $H_2N(CH_2)_3-Si(OH)_{2-y}(OM)_yCH_3$, $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_5)_2CH_3$, $H_2N(CH_2)_2NH(CH_2)_3-Si(OH)_{3-x}(OM)_x$, $H_2N(CH_2)_2NH(CH_2)_3-Si(OH)_{2-y}(OM)_yCH_3$, cyclo-$C_6H_{11}NH(CH_2)_3-Si(OCH_3)_3$, cyclo-$C_6H_{11}NH(CH_2)_3-Si(OC_2H_5)_3$, cyclo-$C_6H_{11}NH(CH_2)_3-Si(OCH_3)_2CH_3$, cyclo-$C_6H_{11}NH(CH_2)_3-Si(OC_2H_5)_2CH_3$, cyclo-$C_6H_{11}NH(CH_2)_3-Si(OH)_{3-x}(OM)_x$ and cyclo-$C_6H_{11}NH(CH_2)_3-Si(OH)_{2-y}(OM)_yCH_3$, in which $H_2N(CH_2)_2NH(CH_2)_3-Si(OCH_3)_3$, $H_2N(CH_2)_2NH(CH_2)_3-Si(OC_2H_5)_3$, $H_2N(CH_2)_2NH(CH_2)_3-Si(OCH_3)_2CH_3$, $H_2N(CH_2)_2NH(CH_2)_3-Si(OC_2H_5)_2CH_3$, $H_2N(CH_2)_2NH(CH_2)_3-Si(OH)_{3-x}(ONa)_x$, $H_2N(CH_2)_{2NH}(CH_2)_3-Si(OH)_{2-y}(ONa)_yCH_3$, cyclo-$C_6H_{11}NH(CH_2)_3-Si(OCH_3)_3$, cyclo-$C_6H_{11}NH(CH_2)_3-Si(OC_2H_5)_3$, cyclo-$C_6H_{11}NH(CH_2)_3-Si(OCH_3)_2CH_3$, cyclo-$C_6H_{11}NH(CH_2)_3-Si(OC_2H_5)_2CH_3$, cyclo-$C_6H_{11}NH(CH_2)_3-Si(OH)_3-x(ONa)_x$ and cyclo-$C_6H_{11}NH(CH_2)_3-Si(OH)_2-y(ONa)_yCH_3$ are preferred and $H_2N(CH_2)_2NH(CH_2)_3-Si(OCH_3)_3$, $H_2N(CH_2)_2NH(CH_2)_3-Si(OCH_3)_2CH_3$, cyclo-$C_6H_{11}NH(CH_2)_3-Si(OCH_3)_3$, cyclo-$C_6H_{11}NH(CH_2)_3-Si(OCH_3)_2CH_3$, $H_2N(CH_2)_2NH(CH_2)_3-Si(OH)_3-x(ONa)_x$ and $H_2N(CH_2)_2NH(CH_2)_3-Si(OH)_2-y(ONa)_yCH_3$ are particularly preferred, where x is 0, 1, 2 or 3, y is 0, 1 or 2 and M is the cation of sodium or potassium.

Silanes of formula (IV) are commercially available and can be prepared by processes known in silicon chemistry. Reference may be made, for example, to W. Noll, "Chemie und Technologie der Silicone (Chemistry and Technology of the Silicones)", 1968, Verlag Chemie, page 149 et seq.

If the organosilicon compound containing units of formula (IV) is an organopolysiloxane, the average value of b is preferably between 0.5 and 2.5, and more preferably between 1.4 and 2.0, the average value of c is preferably between 0.01 and 1.0, and more preferably between 0.01 and 0.6, and the average value of d is preferably between 0 and 2.0, and more preferably between 0 and 0.2, with the proviso that the sum of b, c and d is less than or equal to 3.

The organopolysiloxanes containing units of formula (IV) which are employed in this invention have a viscosity at 25° C. of preferably from 5 to $10^5$ mPa·s, and more preferably from 10 to $10^4$ mPa·s.

Examples of organopolysiloxanes which contain units of formula (IV) and are employed in this invention are

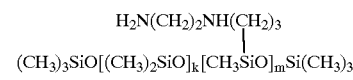

(IVa)

and

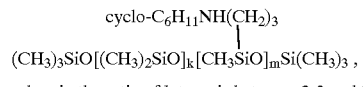

(IVb)

wherein the ratio of k to m is between 2:3 and 9:1 and the sum of k and m is between 10 and 1000, and

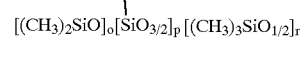

(IVc)

-continued and

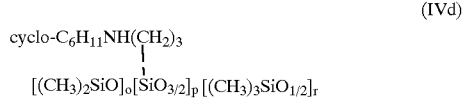

(IVd)

wherein the sum of o+p+r is between 10 and 1000, the ratio of o:(o+p+r) is between 0 and 0.9, and more preferably between 0.2 and 0.7, the ratio of p:(o+p+r) is between 0.05 and 0.6, and more preferably between 0.1 and 0.5, and the ratio r:(o+p+r) is between 0.05 and 0.75, and more preferably between 0.2 and 0.6.

The organopolysiloxanes which contain units of formula (IV) and are employed in this invention are preferably organopolysiloxanes of the formulas (IVa), IVb), (IVc) and (IVd) having a viscosity of from 20 to 100,000 mPa·s and an amine number of 0.01 to 4.5. Organopolysiloxanes having a viscosity of 100 to 10,000 mPa·s and an amine number of 0.1 to 1.5 are particularly preferred.

The amine number corresponds numerically to the value which indicates the consumption in ml of 1N HCl for neutralization of 1 g of aminosiloxane.

Organopolysiloxanes which contain units of formula (IV) are commercially available products and can be prepared by processes known in silicon chemistry. Reference may be made, for example, to W. Noll, "Chemie und Technologie der Silicone (Chemistry and Technology of the Silicones)", 1968, Verlag Chemie, page 194 et seq.

Examples of amines of formula (III) are cyclohexylamine, triethylamine, dodecylamine, diethyl-n-propylamine, cyclohexylmethylamine, 2-aminoethanol, 2-amino-n-propanol, 2-amino-2-methyl-1-propanol, 2-dimethylamino-2-methyl-1-propanol, N,N-diethylethanolamine, N,N-dimethylethanolamine and aniline, in which dodecylamine, 2-aminoethanol and 2-amino-2-methyl-1-propanol is preferred and 2-amino-2-methyl-1-propanol is more preferred.

Organosilicon compounds which have at least one organic radical containing basic nitrogen and contain units of formula (IV), and in particular potassium N-(2-aminoethyl-3-aminopropylmethylsilanolate, sodium N-(2-aminoethyl)-3-aminopropylmethylsilanolate, and compounds of the formulas (IVa) and (IVc) are preferably employed as component (D).

Compound (D) which contains basic nitrogen and is employed in this invention can be a single type or a mixture of at least two types of such compounds.

Compound (D) which contains basic nitrogen is employed in the preparation of the aqueous organopolysiloxane dispersions of this invention in amounts of preferably from 0.1 to 5.0 parts by weight, and more preferably from 0.5 to 2.0 parts by weight, per 100 parts by weight of organopolysiloxane (A) containing groups which are capable of condensation.

Polyvinyl alcohols having a molecular weight of between 20,000 and 100,000 and a hydrolysis number of more than 100 are preferably employed as component (E) in the aqueous organopolysiloxane dispersions of this invention.

Component (E) is employed in the aqueous organopolysiloxane dispersions of the invention in amounts of preferably from 0.5 to 10 parts by weight, and more preferably from 1 to 5 parts by weight, per 100 parts by weight of organopolysiloxane (A) containing groups which are capable of condensation.

The aqueous organopolysiloxane dispersions of this invention furthermore can contain additional components, such as, plasticizers, foam suppressants, pigments, soluble dyestuffs, fungicides, perfumes and organic solvents which are inert with respect to the dispersions.

Examples of plasticizers are trimethylsiloxy endblocked dimethylpolysiloxanes which are liquid at room temperature and have a viscosity of at least 10 mPa·s.

Examples of organic solvents which are inert with respect to the dispersions are hydrocarbons, such as petroleum ether of various boiling ranges, n-pentane, n-hexane, a hexane isomer mixture, toluene and xylene.

The groups of substances mentioned above as additional components may be used in the aqueous dispersions of this invention, as a single substance of this group or a mixture of at least two of these substances which are different can be used as a single component.

Solids content of up to 90% by weight are achieved in the aqueous organopolysiloxane dispersions of this invention. Solids content is to be understood as meaning the proportion by weight of all the constituents of the dispersion, excluding water and organic solvent, if used, of the total weight of the dispersion. The aqueous organopolysiloxane dispersions of this invention preferably have solids content of from 30 to 90% by weight, and more preferably from 40 to 85% by weight. Dispersions having lower solids content are of course possible, however, they are not as economical.

The aqueous organopolysiloxane dispersions of this invention can be prepared in the same manner in which aqueous dispersions of organopolysiloxanes have been prepared heretofore.

The preferred procedure for preparing the aqueous dispersions of this invention comprises dissolving the organopolysiloxane resin (C) in the organopolysiloxane (A) containing groups which are capable of condensation and emulsifying the solution with polyvinyl alcohol (E) and water and if appropriate the other components.

If the other components are water-soluble, they are either dissolved directly in the water used for the emulsification or are added to the aqueous dispersion. The water-insoluble components are either employed as a dispersion or emulsified together with the solution of component (C) and component (A).

The emulsification or dispersion can be carried out in conventional mixing apparatuses which are suitable for preparing emulsions or dispersions, such as, for example, high-speed stator-rotor stirring apparatuses according to Prof. P. Willems, known by the registered trademark "Ultra-Turrax". Reference may also be made to Ullmanns Encyklop ädie der Technischen Chemie (Ullmann's Encyclopedia of Industrial Chemistry), Urban & Schwarzenberg, Munich, Berlin, 3rd edition, volumn 1, page 720 et seq.

The aqueous organopolysiloxane dispersions of this invention can be employed for all purposes for which aqueous organopolysiloxane dispersions have been used heretofore. They can be used, for example, as sealing compositions, paints and paint systems and as electrically insulating or conductive, hydrophobic coating systems which repel adhesive substances, or as a base or additive to such systems.

The aqueous organopolysiloxane dispersions of this invention harden at room temperature within a short time, after evaporation of the water and if appropriate organic solvents, to form elastomers.

The aqueous dispersions of this invention, especially those which have been prepared using polyvinyl alcohols, have the advantage that they harden in thin layers to give transparent elastomers.

The aqueous dispersions of this invention have the added advantage that they form firmly adhering coatings on many substrates, such as, for example, paper, textiles, mineral building materials, plastics, wood and many other substrates. Coating can be carried out, for example, by brushing, rolling, dipping or spraying.

In the examples described below, all the parts and percentages are by weight, unless otherwise specified. All the viscosity data was determined at a temperature of 25° C. Unless otherwise specified, the following examples were carried out under a pressure of the surrounding atmosphere, that is, 1000 hPa, and at room temperature, that is at about 22° C., or at a temperature which is attained, without additional heating or cooling, when the reactants are brought together at room temperature.

The elastomeric properties are in each case determined by the following standardized tests:

| | |
|---|---|
| Tear strength | DIN 53504-85S1 |
| Elongation at break | DIN 53504-85S1 |
| Modulus | DIN 53504-85S1 |
| Shore A hardness | DIN 53505-87 |
| Tear propagation resistance | ASTM D624B-73 |

EXAMPLE 1

(I)—Preparation of an aqueous solution of potassium N-(2-aminoethyl)-3-aminopropylmethylsilanolate About 103 g of N-(2-aminoethyl)-3-aminopropylmethyldimethoxysilane (commercially available under the name "Silan GF 95" from Wacker-Chemie GmbH, Munich) are metered into a solution containing 63.7 g of potassium hydroxide (88% strength in water) in 200 g of water, while stirring vigorously. First methanol and then about 70 g of water are distilled off from the mixture by heating. The mixture is then made up to a total weight of 317 g by addition of water. A 40% potassium N-(2-aminoethyl)-3-aminopropylmethylsilanolate solution is obtained.

(II)—Preparation of an aqueous dispersion of condensation catalyst (B)

About 125 g of dibutyltin dilaurate are emulsified together with 10 g of tributylphenol polyglycol ether (commercially available under the name "Sagopenat T130" from Hoechst AG) and 365 g of water.

About 200 g of α,ω-dihydroxypolydimethylsiloxane having a viscosity of 80,000 mPa·s and 5.00 g of $[CH_3SiO_{3/2}]_{0.8}[(CH_3)_2—SiO]_{0.2}$ having an average molecular weight of 3000 are mixed. The mixture is then converted into an emulsion with 25.0 g of water and 50 g of a 10% solution of a polyvinyl alcohol having a molecular weight of 85,000 and a hydrolysis number of 240 (commercially available under the name "Polyviol W 30/240" from Wacker-Chemie GmbH) in water with the aid of an Ultra-Turrax mixer. After addition of 2.8 g of the aqueous potassium N-(2-aminoethyl)-3-aminopropylmethylsilanolate solution described in (I) above and 1.4 g of the aqueous condensation catalyst (B) dispersion described in (II) above, a white, stable aqueous dispersion is obtained which can be stored for at least 6 months.

Two-hundred hours after preparation of the aqueous dispersion, a film 2 mm in thickness is prepared by applying the aqueous dispersion to a polytetrafluoroethylene (PTFE) surface and then allowing the water to evaporate at room temperature. Two weeks after the application, a dry, transparent and elastic film is formed and analyzed for its elastomer properties. The results of the analysis are found in Table 1.

EXAMPLE 2

About 200 g of α,ω-dihydroxypolydimethylsiloxane having a viscosity of 80,000 mPa·s and 5.00 g of $[CH_3SiO_{3/2}]_{0.8}[(CH_3)_2—SiO]_{0.2}$ having an average molecular weight of 3000 are mixed. The mixture is then converted into an emulsion with 25.0 g of water and 50 g of a 10% solution of a polyvinyl alcohol having a molecular weight of 36,000 and a hydrolysis number of 20 (commercially available under the name "Polyviol G 10/20" from Wacker-Chemie GmbH) in water with the aid of an Ultra-Turrax mixer. After addition of 2.8 g of the polydimethylsiloxane containing 3-(2-aminoethylamino)propyl functional groups and having a viscosity of 1000 mPa·s and an amine number of 0.3 (commercially available under the name "Finish WR 1300" from Wacker-Chemie GmbH, Munich) and 1.4 g of the aqueous condensation catalyst (B) dispersion described in Example 1 (II), a white, stable aqueous dispersion is obtained which can be stored for at least 6 months.

Two-hundred hours after preparation of the aqueous dispersion, a film 2 mm thick is prepared by applying the aqueous dispersion to a polytetrafluoroethylene (PTFE) surface and then allowing the water to evaporate at room temperature. Two weeks after the application, a dry, transparent and elastic film is formed and analyzed for its elastomer properties. The results of the analysis are found in Table 1.

EXAMPLE 3

About 200 g of α,ω-dihydroxypolydimethylsiloxane having a viscosity of 80,000 mPa·s and 8.00 g of $[CH_3SiO_{3/2}]_{0.8}[(CH_3)_2—SiO]_{0.2}$ having an average molecular weight of 3000 are mixed. The mixture is then converted into an emulsion with 25.0 g of water and 50 g of a 10% strength solution of a polyvinyl alcohol having a molecular weight of 36,000 and a hydrolysis number of 20 (commercially available under the name "Polyviol G 10/20" from Wacker-Chemie GmbH) in water with the aid of an Ultra-Turrax mixer. After addition of 2.8 g of the polydimethylsiloxane containing 3-(2-aminoethylamino)propyl functional groups and having a viscosity of 1000 mPa·s and an amine number of 0.3 (commercially available under the name "Finish WR 1300" from Wacker-Chemie GmbH, Munich) and 1.4 g of the aqueous condensation catalyst (B) dispersion described in Example 1 (II), a white, stable aqueous dispersion is obtained which can be stored for at least 6 months.

Two-hundred hours after preparation of the aqueous dispersion, a film 2 mm thick is produced by applying the aqueous dispersion to a polytetrafluoroethylene (PTFE) surface and then allowing the water to evaporate at room temperature. Two weeks after the application, a dry, transparent and elastic film is formed and analyzed for its elastomer properties. The results of the analysis are found in Table 1.

TABLE 1

| | Exp. 1 | Exp. 2 | Exp. 3 |
|---|---|---|---|
| Tear Strength (N/mm$^2$) | 1.1 | 0.9 | 0.9 |
| Elongation at break (%) | 340 | 300 | 220 |
| Modulus[1]) N/mm$^2$) | 0.6 | 0.4 | 0.7 |

TABLE 1-continued

| | Exp. 1 | Exp. 2 | Exp. 3 |
|---|---|---|---|
| Short A hardness | 28 | 22 | 35 |
| Tear propagation resistance (N/mm) | 4.6 | 4.0 | 4.1 |

Comparative Example 1

About 200 g of α,ω-dihydroxypolydimethylsiloxane having a viscosity of 80,000 mPa·s and 5.00 g of [CH$_3$SiO$_{3/2}$]$_{0.8}$[(CH$_3$)$_2$—SiO]$_{0.2}$ having an average molecular weight of 3000 are mixed. The mixture is then converted into an emulsion with 70.0 g of water and 8.25 g of polyethylene glycol-(10) isotridecyl ether (commercially available under the name "Arlypon IT 1011" from Grunau) with the aid of an Ultra-Turrax mixer. After addition of 2.8 g of the aqueous potassium N-(2-aminoethyl)-3-aminopropylmethylsilanolate solution described in Example 1 (I) and 1.4 g of the aqueous condensation catalyst (B) dispersion described in Example 1 (II), a white, stable aqueous dispersion is obtained which can be stored for at least 6 months. Two-hundred hours after the aqueous dispersion had been prepared, it was applied to a polytetrafluoroethylene (PTFE) surface and the water allowed to evaporate at room temperature. Two weeks after the application, a dry, cloudy and elastic film 2 mm in thickness is formed.

Comparative Example 2

The procedure described in Comparative Example 1 is repeated, except that 8.25 g of sodium dodecylbenzenesulfonate was substituted for 8.25% of polyethylene glycol-(10) isotridecyl ether. A white, stable aqueous dispersion is obtained which can be stored for at least 6 months.

Two-hundred hours after preparation of the aqueous dispersion, a 2 mm thick film is prepared by applying the aqueous dispersion to a polytetrafluoroethylene (PTFE) surface and the water allowed to evaporate at room temperature. Two weeks after the application, a dry, cloudy and elastic film is formed.

What is claimed is:

1. An aqueous organopolysiloxane dispersion which cures to form a transparent elastomer, comprising (A) an organopolysiloxane containing groups which are capable of condensation, (B) a condensation catalyst, (C) an organopolysiloxane resin which is at least partly soluble in organopolysiloxane (A) when present in amounts of up to 50% by weight based on the weight of (A), (D) a compound containing basic nitrogen and (E) a polyvinyl alcohol.

2. The aqueous dispersion of claim 1, wherein the polyvinyl alcohol (E) is employed in amounts of from 0.5 to 10 parts by weight per 100 parts by weight of organopolysiloxane (A).

3. The aqueous dispersion of claim 1, wherein the polyvinyl alcohol (E) has a molecular weight of from 20,000 to 100,000 and a hydrolysis number of more than 100.

4. The aqueous dispersion of claim 1, wherein the organopolysiloxane (A) has the formula RO—[SiR$^1_2$O]$_n$—R  (I), in which R is selected from the group consisting of a hydrogen atom and alkyl radical having from 1 to 6 carbon atom(s), R$^1$ is selected from the group consisting of hydrocarbon radicals having 1 to 18 carbon atom(s), and hydrocarbon radicals having from 1 to 18 carbon atom(s) which are substituted by radicals selected from the group consisting of halogen atoms, amino groups, ether groups, ester groups, epoxy groups, mercapto groups, cyano groups and (poly)glycol radicals, in which the (poly)glycol radicals contain oxyethylene and/or oxypropylene units, and n is an integer of at least 30.

5. The aqueous dispersion of claim 1, wherein the organopolysiloxane resin (C) contains units of the formula $$R^2_a SiO_{\frac{4-a}{2}},$$  (II)

in which R$^2$ is selected from the group consisting of hydrocarbon radicals having from 1 to 18 carbon atom(s), and hydrocarbon radicals having from 1 to 18 carbon atom(s) which are substituted by radicals selected from the group consisting of halogen atoms, amino groups, ether groups, ester groups, epoxy groups, mercapto groups, cyano groups and (poly)glycol radicals, in which the (poly)glycol radicals contain oxyethylene units and/or oxypropylene units, and a is a number having an average value of from 0.5 to 1.95.

6. The aqueous dispersion of claim 1, wherein the organopolysiloxane resin (C) has the formula [CH$_3$SiO$_{3/2}$]$_{0.6-0.8}$ [(CH$_3$)$_2$—SiO]$_{0.2-0.4}$.

7. The aqueous dispersion of claim 1, wherein the organopolysiloxane resin (C) is employed in amounts of from 0.1 to 100 parts by weight per 100 parts by weight of organopolysiloxane (A).

8. The aqueous dispersion of claim 1, wherein component (D) is an organosilicon compound which has at least one organic radical containing basic nitrogen and contains units of the formula $$R^4_b Y_c Si(OR^5)_d O_{\frac{4-b-c-d}{2}},$$  (IV)

in which R$^4$ is a monovalent organic radical which is free from basic nitrogen, R$^5$ is selected from the group consisting of a hydrogen atom, an alkyl radical, an alkali metal cation, an ammonium group and a phosphonium group, Y is a monovalent SiC-bonded radical containing basic nitrogen, b is 0, 1, 2 or 3, c is 0, 1, 2, 3 or 4 and d is 0, 1, 2 or 3, with the proviso that the sum of b, c and d is less than or equal to 4 and at least one radical Y is present per molecule.

9. A process for preparing the aqueous dispersion of claim 1, which comprises dissolving the organopolysiloxane resin (C) in the organopolysiloxane (A) containing groups which are capable of condensation and then emulsifying the solution with polyvinyl alcohol (E) and water.

10. An aqueous organopolysiloxane dispersion as claimed in claim 1 comprising (A) an organopolysiloxane having the formula RO—[SiR$^1_2$O]$_n$—R  (I), in which R is selected from the group consisting of a hydrogen atom and alkyl radical having from 1 to 6 carbon atom(s), R$^1$ is selected from the group consisting of hydrocarbon radicals having 1 to 18 carbon atom(s), and hydrocarbon radicals having from 1 to 18 carbon atom(s) which are substituted by radicals selected from the group consisting of halogen atoms, amino groups, ether groups, ester groups, epoxy groups, mercapto groups, cyano groups and (poly)glycol radicals, in which the (poly)glycol radicals contain oxyethylene and/or oxypropylene units, and n is an integer of at least 30, (B) a condensation catalyst,
(C) an organopolysiloxane resin containing units of the formula $$R^2_a SiO_{\frac{4-a}{2}}, \quad (II)$$

in which $R^2$ is selected from the group consisting of hydrocarbon radicals having from 1 to 18 carbon atom(s), and hydrocarbon radicals having from 1 to 18 carbon atom(s) which are substituted by radicals selected from the group consisting of halogen atoms, amino groups, ether groups, ester groups, epoxy groups, mercapto groups, cyano groups and (poly)glycol radicals, in which the (poly)glycol radicals contain oxyethylene units and/or oxypropylene units, and a is a number having an average value of from 0.5 to 1.95, (D) an organosilicon having at least one organic radical containing basic nitrogen comprising units of the formula $$R^4_b Y_c Si(OR^5)_d O_{\frac{4-b-c-d}{2}}, \quad (IV)$$

in which $R^4$ is a monovalent organic radical which is free from basic nitrogen, $R^5$ is selected from the group consisting of a hydrogen atom, an alkyl radical, an alkali metal cation, an ammonium group and a phosphonium group, Y is a monovalent SiC-bonded radical containing basic nitrogen, b is 0, 1, 2 or 3, c is 0, 1, 2, 3 or 4 and d is 0, 1, 2 or 3, with the proviso that the sum of b, c and d is less than or equal to 4 and at least one radical Y is present per molecule and (E) a polyvinyl alcohol.

11. An elastomer prepared from an aqueous dispersion, comprising (A) an organopolysiloxane containing groups which are capable of condensation, (B) a condition catalyst, (C) an organopolysiloxane resin which is partly soluble in organopolysiloxane (A) when present in amounts of up to 50% by weight based on the weight of (A), (D) a compound containing basic nitrogen and (E) a polyvinyl alcohol, wherein said elastomer is transparent.

* * * * *